United States Patent [19]

White

[11] Patent Number: 5,320,201
[45] Date of Patent: Jun. 14, 1994

[54] TRUCK BRAKE DRUM WITH INCREASED COOLING

[75] Inventor: Jay D. White, Galesburg, Mich.
[73] Assignee: Eaton Corporation, Cleveland, Ohio
[21] Appl. No.: 989,968
[22] Filed: Dec. 11, 1992

Related U.S. Application Data

[63] Continuation-in-part of Ser. No. 799,819, Nov. 29, 1991, abandoned.

[51] Int. Cl.$^5$ ............................................. F16D 65/78
[52] U.S. Cl. ................................................ 188/264 A
[58] Field of Search ........... 188/218 R, 264 R, 264 A, 188/264 AA, 74; 192/70.12, 113 A

[56] References Cited

U.S. PATENT DOCUMENTS

| | | | |
|---|---|---|---|
| 2,024,243 | 12/1935 | Nelson | 188/264 R |
| 2,059,170 | 10/1936 | Farr | 188/264 R |
| 2,910,148 | 10/1959 | Ferrell et al. | 188/264 R |
| 2,998,870 | 9/1961 | Herman et al. | 188/264 R |
| 3,144,099 | 8/1964 | Cadmus | 188/264 R |

Primary Examiner—Robert J. Oberleitner
Assistant Examiner—Lee W. Young
Attorney, Agent, or Firm—L. H. Uthoff, Jr.

[57] ABSTRACT

A brake drum generally cylindrically shaped having a substantially closed end forming a drum face and an open end with airflow channels formed in the outside peripheral surface of the brake drum in substantial alignment with a plurality of wheel hand hold openings and a squealer band positioned at the edge of the open end to improve cooling of the tire bead area of the wheel rim by increasing the airflow between the brake drum and the wheel rim thereby reducing the heat transferred from the brake drum into the wheel rim.

13 Claims, 2 Drawing Sheets

FIG 1
PRIOR ART
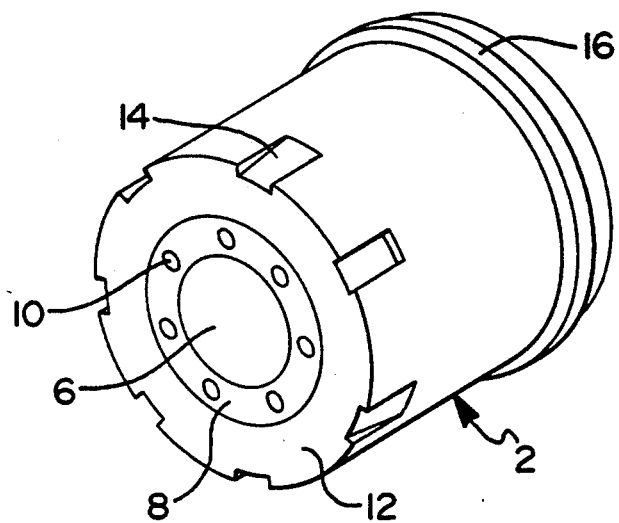
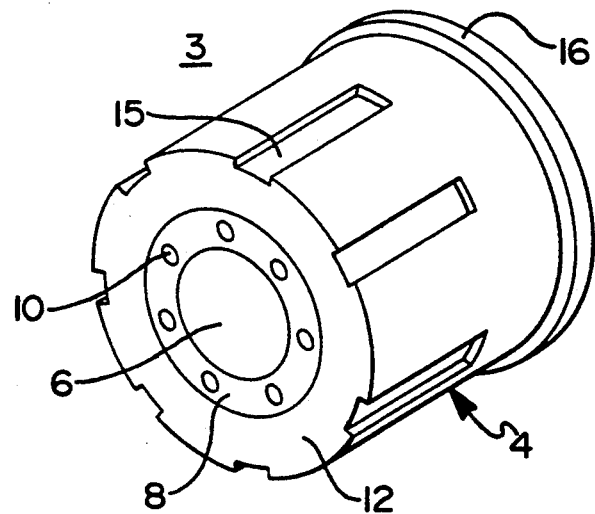
FIG 2

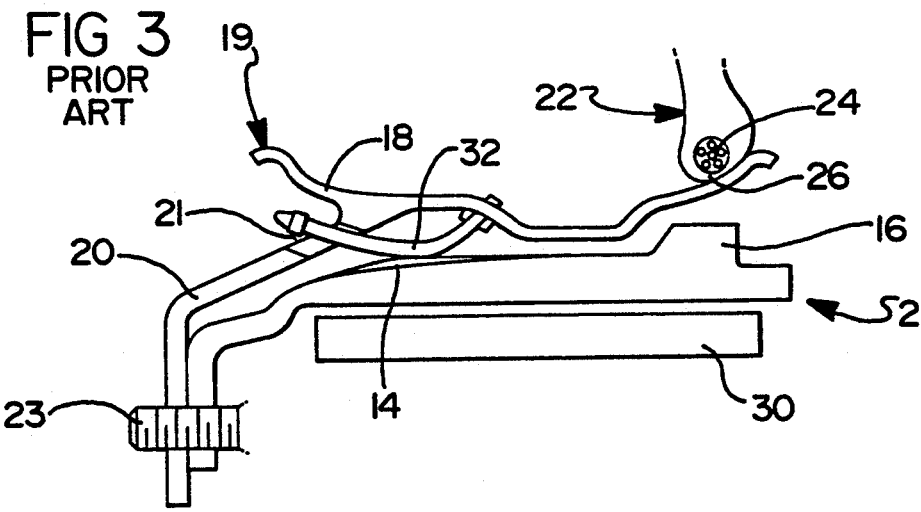
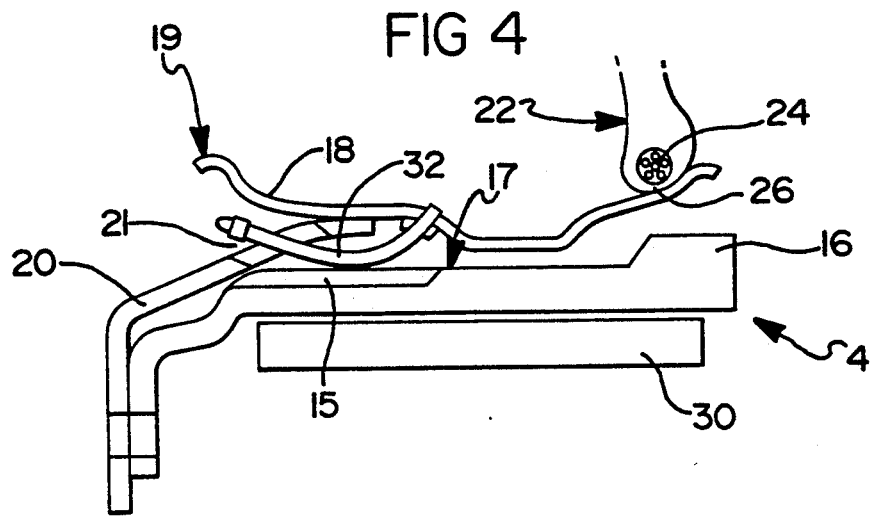
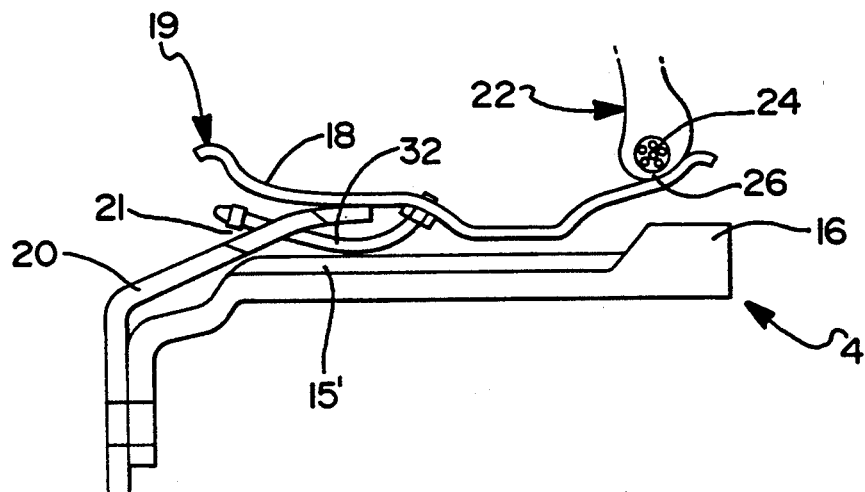

TRUCK BRAKE DRUM WITH INCREASED COOLING

RELATED APPLICATIONS

This application is related to application Ser. No. 07/799,816 entitled Truck Brake System With Reduced Diameter assigned to the same assignee, Eaton Corporation, as this Application and filed the same date Nov. 29, 1991 as this Application. This application is a continuation-in-part of applicant's copending application U.S. Ser. No. 07/799,819, filed Nov. 29, 1991, which application is now abandoned.

FIELD OF THE INVENTION

This invention relates to a truck brake drum. More specifically, this invention relates to a truck brake drum with airflow channels and a relocated squealer band for improved airflow and cooling.

DESCRIPTION OF THE PRIOR ART

It is known to arrange the mechanical components of a truck tire wheel and brake drum to enhance airflow over the surface of the drum to minimize the heat conducted into the tire bead through the wheel. It is also known to position the drum squealer band at the innermost periphery of the drum for noise control and packaging purposes. When large diameter wheels and tires are used on a truck, the clearance between the inner diameter of the wheel and the outer diameter of the brake drum is sufficient to allow for air passage therebetween. Small indentations at the outer peripheral edge of the drum are common so as to allow for clearance of the tire valve stem when the drum is mounted to the truck hub in any position on the hub mounting bolts.

Without the indentations on the drum, the tire valve stem would rub against the outer surface of the brake drum unless a smaller diameter drum was used with that particular wheel size. If a smaller diameter drum is used, the stopping capability of the drum and brake would be diminished so that the operating temperature would be higher resulting in decreased life of the brake and tire. The brake width could be increased to lower the temperature but would result in a more difficult packaging environment and would effectively limit the minimum size of the wheel and the brake drum diameter.

If the tire diameter could be reduced, the floor of the trailer could be lowered while maintaining adequate clearance between the top of the tire and the floor of the trailer. However, a reduced diameter tire would require a reduced diameter wheel which would also require a similar reduction in the diameter of the brake drum. For a given gross vehicle weight (GVW), the brake drum would have to be widened to provide adequate braking without overheating of the brake or tire. Tire and brake temperatures could be reduced by increasing airflow over the brake drum to provide adequate heat rejection at the outer diameter of the brake drum. High brake temperatures are transferred to the tire which result in a breakdown of the tire bead area due to high temperature at the bead area and wheel interface. The tire bead area rubber material contains a quantity of sulfur which reacts to high temperatures and the bead area becomes brittle with time. After sufficient deterioration, the bead area, where it is formed by a section of rubber which extends around a circumferential band formed by a number of steel wires or other strong material, becomes brittle and could break loose so that the tire sidewall could separate from the wheel rim causing a catastrophic failure.

If a standard design, reduced diameter, brake drum with increased width is used with the reduced diameter wheel, the drum width would have to be greatly increased to provide for adequate cooling to meet tire life and brake duty cycle requirements and the brake would be expensive and difficult to package.

SUMMARY OF THE INVENTION

The present invention allows the use of a larger diameter brake drum to be used with a given wheel diameter by increasing the cooling airflow over the surface of the brake drum. The introduction of airflow channels of the present invention in the outer peripheral surface of the brake drum provide additional airflow by directing air at the outside of the wheels through openings therein and inbetween the brake drum and wheel. The increased airflow over the brake drum surface results in a reduction in the heat that is convected into the wheel and subsequently into the bead of the tire mounted thereon. By decreasing the temperature of the tire bead, tire life is greatly extended which is a major concern.

To provide for the maximum clearance between the wheel and the outer diameter of the drum for enhanced airflow over the surface, the drum squealer band, which is a thicker section of the drum forming a circumferential ring for reduction of high frequency vibration, is moved inward so that the edge of the squealer band is in alignment with the edge of the brake drum opposite the wheel. The relocated squealer band contributes to the cooling efficiency provided by the airflow channels cut into the drum surface by increasing the clearance between the wheel rim and the squealer band to facilitate airflow over the brake drum surface.

BRIEF DESCRIPTION OF THE DRAWINGS

FIG. 1 is a perspective view of a prior art truck brake drum;

FIG. 2 is a perspective view of a truck brake drum of the present invention;

FIG. 3 is a cross-sectional view of a prior art truck brake drum and wheel;

FIG. 4 is a cross-sectional view of a truck brake drum and wheel of the present invention;

FIG. 5 is a cross-sectional view of an alternative embodiment of the present invention showing an airflow channel extended to the squealer band.

DETAILED DESCRIPTION OF THE PREFERRED EMBODIMENT

Referring to FIG. 1, a prior art brake drum 2 is shown having an open center section 6 which is placed over the end of an axle spindle where a plurality of bolt holes 10 engage a like plurality of wheel mounting bolts. The mounting flange 8 contacts the inner surface of a wheel and works in conjunction with the axle mounting bolts to support and secure the wheel in position on the axle securing the brake drum therebetween. The drum face 12 has a plurality of clearance notches 14 cut into the outer peripheral edge of the prior art brake drum 2 for clearance of a tire valve stem. The clearance notches 14 are oriented with one axis centerline towards the centerline of the prior art brake drum 2 for clearance of the tire valve stem and are of a minimum length to accomplish the same result. A raised piece of additional drum material commonly called a squealer band 16 is located towards the inner side of prior art brake drum 2.

Now referring to FIG. 2, the increased cooling brake drum 4 of the present invention is shown. In the place of the prior art clearance notches 14, but in a like location on the drum, are a plurality of airflow channels 15 which extend to a depth of approximately 20% to 40% of the thickness of the brake drum 4 at a point taken immediately adjacent to the airflow channel 15 and have a minimum width of six (6) percent of the inside diameter of the brake drum 2. The relatively wide width of the channels 15 are easier and less expensive to fabricate as compared to narrow fins as disclosed in U.S. Pat. Nos. 2,998,870 and 2,059,170. The airflow channel 15 extends from the drum face 12 inward to a point at approximately 50% of the total width of the brake drum 4, thereby providing for not only clearance for the tire valve stem but more importantly for increased airflow over the surface of the brake drum 4. The brake drum squeeler band 16, which is a section of increased drum thickness, is moved towards the innermost edge of the brake drum 4 which increases the clearance between the outer brake drum surface and the inner surface of the wheel rim and aids in the movement and cooling effect of the airflow over the brake drum 4.

An alternative embodiment includes airflow channels 15 which change in a cross-sectional area either with position along the length of the brake drum 4, and/or along the circumferential position of the airflow channel 15. An example being a draft angle added to the airflow channel 15 of approximately one (1) percent to allow the casting die to be easily removed.

Now referring to FIG. 3, a sectional view of a prior art brake drum 2 and wheel assembly 19 is shown. The tire valve stem 32 is shown extending from the center portion of the wheel rim 18, known as its drop center, past the top surface of the prior art brake drum 2 and over the clearance notch 14 through one of the wheel hand hold openings 21. The portion of the tire 22 that comes in contact with the wheel rim 18 is shown. The tire 22 includes a wire bead stiffener 24 which consists of a plurality of steel or other strong fibers that are wound in a circumferential fashion at the innermost portion of the tire strengthening and helping to form tire bead 26.

The squealer band 16 of the prior art brake drum 2 is shown just under the portion of the wheel 18 that supports the tire bead 26 where the heat conducting from the prior art brake drum 2 passes through a small air space between the squealer band 16 and the wheel rim 18 which is conducted into the tire bead 26. The chemical composition of the rubber tire bead area, often contains sulfur which causes the bead area to become brittle and fail after a period of time due to high temperature. The close proximity of the drum squealer band 16 to the wheel rim 18 precludes the free movement of airflow. Also, the restricted area between the prior art brake drum 2 and a surface of the wheel rim 18 at the midpoint of the prior art brake drum 2 also impedes the free flow and movement of air over the surface of the prior art brake drum 2, thereby increasing brake drum temperature which is conducted and convected reaching the tire bead 26 resulting in decreased service life.

Now referring to FIG. 4, a cross-section of a brake drum 4 with the improved cooling airflow channels and a relocated squealer band as disclosed in FIG. 2 is shown. Airflow channels 15 have been formed in the outer surface of the brake drum 4 and extend to approximately the midpoint of the brake drum outer surface 17 thereby providing for increased clearance between the brake drum 4 and the wheel rim 18. Also shown is the relocated squealer band 16 where its position has been moved to the innermost edge of the brake drum 4 thereby providing additional clearance between the squealer band 16 and the wheel rim 18 at the position of the tire bead 26. The relocation of the squealer band 16 to this position, promotes airflow over the surface of the brake drum 4 and increases the distance between the squealer band 16 and the wheel rim 18 resulting in a lower temperature of the tire bead 26 for extended life and improved durability. Also shown is the brake shoe 30 which contacts the inner surface of the brake drum 4 causing a retarding torque to be developed which is transferred into the wheel 19 through the wheel mounting bolts 23 thereby slowing the vehicle. The wheel 20, which is attached to the wheel rim 18, extends towards the center of the brake drum 4 so as to engage the plurality of wheel mounting bolts 23 extending from an axle spindle. By using the present invention to increase airflow over the surface of the brake drum, the tire bead 26 temperature is typically lowered by 20° F. which results in a significant increase in tire life. Outside air is drawn through the wheel hand hold openings 21 along the airflow channels 15 under the wheel rim 18 and exits between the wheel rim 18 and the squealer band 16. There are an identical number of airflow channels 15 and wheel band hold openings 21 and are spaced to be in alignment one with the other.

An alternative embodiment is shown in FIG. 5 and shows the airflow channel 15' extending from one end of the drum outside generally cylindrical surface to the squeeler band 16. The extended airflow channels 15' further increases the airflow between the brake drum 4 and the wheel rim 18. The wider width as compared to the prior art of the airflow channels 15' of a minimum of six (6) percent of the inside drum diameter facilitates manufacture and reduces cost. In addition, since the airflow channels 15' are in alignment with the wheel hand hold openings 21, airflow is greatly increased for additional cooling of the wheel 19 and the tire 22 especially at the tire bead 26. The extended airflow channels 15' have an approximate draft angle of 1° for removal from the casting die. The depth of the airflow channels varies from 40% of the average brake drum 4 thickness at the drum face 12 to 20% of the average brake drum 4 thickness at the squealer band 16.

Also, along the outside peripheral surface of the brake drum 2, there is a minimum separation distance of five (5) percent of the outside circumference of the brake drum 2 between the airflow channels 15'. In the preferred embodiment, there are ten (10) channels equally spaced along the periphery of the brake drum 2 and located so that five (5) of the airflow channels 15' are in alignment with the wheel hand hold openings 21. With this spacing, assembly of the wheel 20 to the mounting bolts will always result in an airflow channel 15' being in alignment with each hand hold opening 21. This airflow channel 15' design provides for improved fatigue resistance, increased stiffness for improved brake torque output, maximized thermal mass for improved energy absorption and is easier and less expensive to fabricate as compared to prior art designs.

It will be appreciated by those of ordinary skill in the art that many variations in the foregoing preferred embodiment are possible while remaining in the scope of the present invention. The present invention should thus not be considered limited in the preferred embodiments or the specific choices of materials, configurations, dimensions, applications or ranges of parameters employed therein.

What is claimed is:

1. A brake drum with improved cooling for interacting with a brake shoe to provide a torque opposing the rotation of a wheel having a tire valve stem and a plurality of hand hold openings where the brake drum has a generally cylindrical shape having an inner braking surface and an outer surface opposite said inner surface where contact with a brake lining material carried by the brake shoe occurs and having a drum face to partially close the end of the cylindrical shaped drum having a plurality of holes therein to allow the wheel mounting bolts to pass therethrough so as to transfer said torque to the wheel and having an axis of rotation, the drum comprising:

a plurality of generally axially extending airflow channels in substantial alignment with said hand hold openings formed on said outer surface of the cylindrical shaped drum, said channels being approximately rectangular in shape and extending from the edge of said cylindrical shape at said drum face toward an open end of said drum to a point between the drum face and said open face and said channels having a depth approximately 40 percent of a nominal thickness of said drum, said channels having a minimum width of 6 percent of the diameter of said brake drum where at least one airflow channel is positioned relative to said wheel mounting bolts to be in substantial alignment with said tire valve stem.

2. The brake drum with improved cooling as defined in claim 1, wherein said airflow channels extend from said drum face toward the open end of said drum to a point approximately 50 percent of the distance between the drum face and said open face.

3. The brake drum with improved cooling as defined in claim 1, wherein said brake drum further comprises a squealer band having an edge in general radial alignment with an edge of said brake drum opposite from said drum face.

4. The brake drum with improved cooling as defined in claim 1, wherein said airflow channels vary in cross-sectional area with positions along a line in an axial direction.

5. The brake drum with improved cooling as defined in claim 3, wherein said airflow channels extend from said drum face toward the open end of said drum to said squealer band.

6. A brake drum with improved cooling for interacting with a brake shoe to provide a torque opposing the rotation of a wheel where the brake drum has a generally cylindrical shape having an inner braking surface where contact with a brake lining material carried by a brake shoe occurs and having a drum face partially closing the end of said brake drum having a plurality of holes therein to allow a wheel mounting bolt to pass therethrough so as to transfer said torque to the wheel said brake drum having a circumferential ring of increased thickness on a brake drum surface opposite the inner braking surface, the drum comprising:

at least three generally axially extending airflow channels formed on the outer surface of the cylindrical shaped drum, said section being approximately rectangular in shape and extending from said drum face toward an open end of said drum to said circumferential ring and having a depth approximately 40 percent of the thickness of said drum, said air channels having a minimum width of 6 percent of the diameter of said brake drum.

7. The brake drum with improved cooling as defined in claim 6, wherein said airflow channels are in substnatial alignment with a plurality of hand hold openings in said wheel.

8. The brake drum with improved cooling as defined in claim 6, wherein said circumferential ring is positioned at the innermost axial position at the edge of the open end of said drum.

9. The brake drum with improved cooling as defined in claim 1, wherein said airflow channels vary in cross-sectional area with positions along a line running in an axial manner to said brake drum.

10. A brake drum with improved cooling for interacting with a brake shoe to provide a torque opposing the rotation of a wheel having a tire valve stem and a plurality of hand hold openings where the brake drum has a generally cylindrical shape having an inner braking surface and an outer surface opposite said inner surface where contact with a brake lining material carried by the brake shoe occurs and having a drum face to partially close the end of the cylindrical shaped drum having a plurality of holes therein to allow the wheel mounting bolts to pass therethrough so as to transfer said torque to the wheel and having an axis of rotation, the drum comprising:

a plurality of generally axially extending airflow channels in substantial alignment with said hand hold openings formed on said outer surface of the cylindrical shaped drum, said channels being approximately rectangular in shape and extending from the edge of said cylindrical shape at said drum face toward an open end of said drum to a point between the drum face and said open face and said channels having a depth approximately 40 percent of a nominal thickness of said drum, said channels having a minimum width of 6 percent of the diameter of said brake drum where at least one airflow channel is positioned relative to said wheel mounting bolts to be in substantial alignment with said tire valve stem; and a squealer band formed on the outer surface of said brake drum, said squealer band comprised of an annular ring attached to said outer surface and positioned one edge of said annular ring in general alignment with an edge of said brake drum opposite from said drum face.

11. The brake drum of claim 10, wherein said airflow channels have a draft angle of approximately one degree relative to said axis of rotation where the radial depth of said airflow channel increases from said drum face to said squealer band.

12. The brake drum of claim 9, wherein said airflow channels are in substantial alignment with said hand hold openings and where said airflow channels are separated one from the other by a minimum circumferential distance of five (5) percent of the outside circumference of said brake drum.

13. A brake drum with improved cooling for interacting with a brake shoe to provide a braking torque opposing the rotation of a wheel having a tire valve stem and a plurality of hand hold openings where the brake drum has a generally cylindrical shape having an inner braking surface and an outer surface opposite said inner braking surface surrounding an axis of rotation and having a drum face to partially close a first end of the brake drum and having an annular squealer band formed on the outer surface in close proximity to a second end of the brake drum, the improvement comprising:

a plurality of axially extending airflow channels each being in substantial alignment with said hand hold openings and formed on said outer surface of the brake drum, said airflow channels being parallel one with another and with the axis of rotation, said airflow channels extending from the first end of the brake drum to the squealer band, said airflow channels having a generally rectangular shape with a depth of approximately 40 percent of a nominal thickness of said drum and a minimum width of 6 percent of the diameter of said brake drum where at least one airflow channel is positioned to be in substantial alignment with the valve stem.

* * * * *